United States Patent [19]
Silverman

[11] Patent Number: 5,875,240
[45] Date of Patent: Feb. 23, 1999

[54] METHOD FOR CALLED PARTY IDENTIFICATION AND CALL RE-ROUTING

[75] Inventor: David Phillip Silverman, Somerville, N.J.

[73] Assignee: AT&T Corp, Middletown, N.J.

[21] Appl. No.: 804,723

[22] Filed: Feb. 21, 1997

[51] Int. Cl.⁶ ....................................... H04M 1/56
[52] U.S. Cl. .................. 379/142; 379/127; 379/133; 379/201; 379/211
[58] Field of Search ..................... 379/120–121, 379/122, 127, 133–136, 142, 201, 207, 156–157, 211–212, 112–114

[56] References Cited

U.S. PATENT DOCUMENTS

| | | | |
|---|---|---|---|
| 5,220,599 | 6/1993 | Sasano et al. ........................... | 379/142 |
| 5,479,496 | 12/1995 | Endo et al. .............................. | 379/211 |
| 5,625,680 | 4/1997 | Foladare et al. ........................ | 379/199 |
| 5,745,553 | 4/1998 | Mirville et al. ........................... | 379/67 |

*Primary Examiner*—Curtis A. Kuntz
*Assistant Examiner*—Duc Nguyen

[57] ABSTRACT

A method and apparatus for a telephone call routed over a network to include called party identification information personally identifying the called individual such that the called individual is distinguished from any other individual associated with a common telephone number of an end-user device. The telephone call is connected or rerouted based upon the called party identification information. Based on the called party identification information, a call may be automatically routed by the network to an end-user device, and the end-user device may further be provided with the called party identification information. A premises-based end-user device may automatically or by user control route the call based on the called party identification information.

14 Claims, 6 Drawing Sheets

| TELEPHONE NUMBER | FACILITIES | CALLER ID | CALL FORWARDING | 3-WAY CALLING | CALLED PARTY ID | CALL WAITING | LANGUAGE PREFERENCE |
|---|---|---|---|---|---|---|---|
| 908-555-1234 | POTS | Y | Y | N | Y | Y | ----- |
| 201-555-2468 | ISDN | Y | N | Y | N | N | ----- |
| 212-555-1776 | POTS | Y | Y | N | Y | Y | SPANISH |
| ⋮ | ⋮ | ⋮ | ⋮ | ⋮ | ⋮ | ⋮ | ⋮ |
| 215-318-9988 | DIGITAL CATV | Y | N | Y | Y | N | FRENCH |

| TELEPHONE NUMBER | FACILITIES | CALLER ID | CALL FORWARDING | 3-WAY CALLING | CALLED PARTY ID | CALL WAITING | LANGUAGE PREFERENCE |
|---|---|---|---|---|---|---|---|
| 908-555-1234 | POTS | Y | Y | N | Y | Y | ----- |
| 201-555-2468 | ISDN | Y | N | Y | N | N | ----- |
| 212-555-1776 | POTS | Y | Y | N | Y | Y | SPANISH |
| ⋮ | ⋮ | ⋮ | ⋮ | ⋮ | ⋮ | ⋮ | ⋮ |
| 215-318-9988 | DIGITAL CATV | Y | N | Y | Y | N | FRENCH |

FIG. 3

| TELEPHONE NUMBER | CALLED PARTY ID INFORMATION | CALL FORWARDING INFORMATION |
|---|---|---|
| 555-3000 | DAVE, DAVID, DAVEY, DXM, DM | MON-FRI 9-5, 555-3001 (POTS) |
| | HILD, HILDY, HILDE, HVS, HS | MON-FRI 9-5, 555-6890 (ISDN)<br>MON-FRI 6-10, 555-4316 (POTS) |
| 555-1234 | STEVE, STEVEY, STEPHEN, SJB, SB | MON-FRI 9AM-7PM 555-1714 (DIGITAL CATV)<br>SAT 555-1614 (ISDN) |
| | JOHN, JOHNNY, JB | MON-FRI 7AM-3PM 555-5224 (ISDN) |
| | KAREN, KOL | SAT, SUN 9AM-9PM 555-2873 (POTS) |
| ⋮ | ⋮ | ⋮ |

METHOD FOR CALLED PARTY IDENTIFICATION AND CALL RE-ROUTING

CROSS-REFERENCE TO RELATED APPLICATIONS

This application is related to the following commonly assigned, co-pending U.S. patent applications which are herein incorporated by reference: Ser. No. 08/632,864, entitled ON-DEMAND COMMUNICATIONS SERVICES, to Mirville et al.; and Ser. No. 08/385,004, entitled METHOD AND APPARATUS FOR PRIORITIZING TELEPHONE CALLS, to Foladare et al.

TECHNICAL FIELD

This invention relates to communications systems, and more particularly to a method and system for providing called party identification information with a call that is placed to an end-user device identified by a telephone number associated with a plurality of individuals who use the end-user device, such that the called party identification information may be used for providing called party information to an individual at a called end-user device without answering the call, and/or for rerouting the call to another destination by a telecommunications network.

BACKGROUND OF THE INVENTION

Advances in communications technology, such as switching systems that can support Local Area Signaling Services (LASS) capabilities, Information Services Digital Network (ISDN) protocols, and Asynchronous Transfer Mode (ATM) standards, have allowed communications carriers to offer a rich set of communications services features to their subscribers. These features include various methods of screening, and forwarding or otherwise rerouting telephone calls. For example, the name or telephone number of the caller party can be displayed on the recipient's telephone (e.g., Caller ID), or telephone calls to a particular telephone number can be automatically forwarded by the telephone network to another destination such as another end-user device or an automated message center.

There also are existing premises-based methods of rerouting telephone calls. For example, premises-based automatic call forwarding, or automated answering systems that allow callers to reroute their telephone call.

The existing methods of call screening and forwarding or rerouting of telephone calls have several disadvantages. One distinct disadvantage with respect to caller ID, for example, is that the caller may be calling from a telephone station which is not necessarily associated with the calling individual, and thus the caller ID information actually does not provide the individual at the called station with any information from which call handling may be decided.

In addition, since an end-user device (e.g., telephone set) is often associated with a single telephone number that is shared by multiple individuals (e.g., family members), neither automatic (i.e., without user intervention in response to the call) network-based nor automatic premises-based call forwarding can practicably be implemented since all individuals will not concurrently and identically invoke call forwarding or otherwise concurrently have the same call forwarding requirements. Concomitantly, from the caller's perspective, the preemption of call forwarding reduces the likelihood that the caller will reach a called individual who shares an end-user device identified by a telephone number associated with at least one other individual.

Accordingly, there is a need for improved and additional call identification and call forwarding systems, and particularly for a method and apparatus that allows a call to be forwarded to a particular called party from among a plurality of individuals associated with a common telephone number, and further for an individual at an end-user device to identify the called party and reroute the call to a different destination, or invoke another call handling procedure, without answering the call.

SUMMARY OF THE INVENTION

The above problems are solved according to the invention by providing a method and apparatus for a telephone call to include information personally identifying the called individual, referred to as called party identification (ID) information, such that the called individual is distinguished from any other individual associated with a common telephone number of one or more end-user devices. The telephone call is connected or rerouted by the network based upon the called party identification information. The called party ID information may be sent to an end-user device along with a ringing signal such that an individual at the end-user device may identify the called party without answering the call, and the individual may further specify call handling instructions for rerouting the call.

More particularly, in an embodiment of the invention, a telephone service provider's network is equipped with an originating switch proximate to the caller's end-user device, and a terminating switch proximate to the called party's end-user device. When a caller at the caller's end-user device places a call to the called party's end-user device, the originating switch obtains called party identification data. The originating switch sends the called party identification data along with the called telephone number to a terminating switch associated with the called party based on the call parameters (e.g., telephone number). The terminating switch queries a database to determine whether the user/entity associated with the telephone number subscribes to the called party identification feature and, if so, what call handling procedure should be invoked conditioned upon the called party identification data. For each of a plurality of telephone numbers, the database stores call handling procedures specified by one or more individuals associated with the telephone number. For each such individual, these call handling procedures preferably include time indexed location and forwarding parameters, and may also include a particular sequence of location/forwarding parameters for a given time. Based on the information retrieved from the database, the terminating switch then sends a message to the originating switch indicating how the call should be routed, and the originating switch routes the call accordingly. Preferably, the routed call includes the called party identification information, which may be displayed on the end-user device to which the call is routed before the call is answered.

In an alternative embodiment, after retrieving called handling procedures the database, the terminating switch rings the called party's end-user device and sends it the called party ID information, and preferably caller ANI information. Also, optionally the preferred time/location and forwarding parameters, and preferably the position in the sequence of preferred time/location and forwarding parameters, specified by the retrieved call handling procedures are also communicated to the called party's end-user device. The terminating switch receives a call handling command from the called party's end-user device and, based on the call handling command, the terminating switch sends an appropriate parameter to the originating switch, which then routes the call accordingly.

BRIEF DESCRIPTION OF THE DRAWINGS

The invention will be described in greater detail below by way of reference to the accompanying drawings, wherein.

DETAILED DESCRIPTION

The present invention provides a mechanism for effectively converting a single telephone number of an end-user device into logically distinct numbers for each of a plurality of users associated with the single telephone number, by using network capabilities to capture, or otherwise acquire, information personally identifying or distinguishing the called individual from among the individuals associated with the single telephone number. This service, herein referred to as called party ID, preferably is implemented on a subscriber basis and, as will be further understood hereinbelow, in various embodiments may also be practiced in connection with the on-demand communications services methods and systems disclosed in commonly assigned U.S. patent application Ser. No. 08/632,864 to Mirville et al., filed on Apr. 16, 1996, which is herein incorporated by reference.

Figure 1:
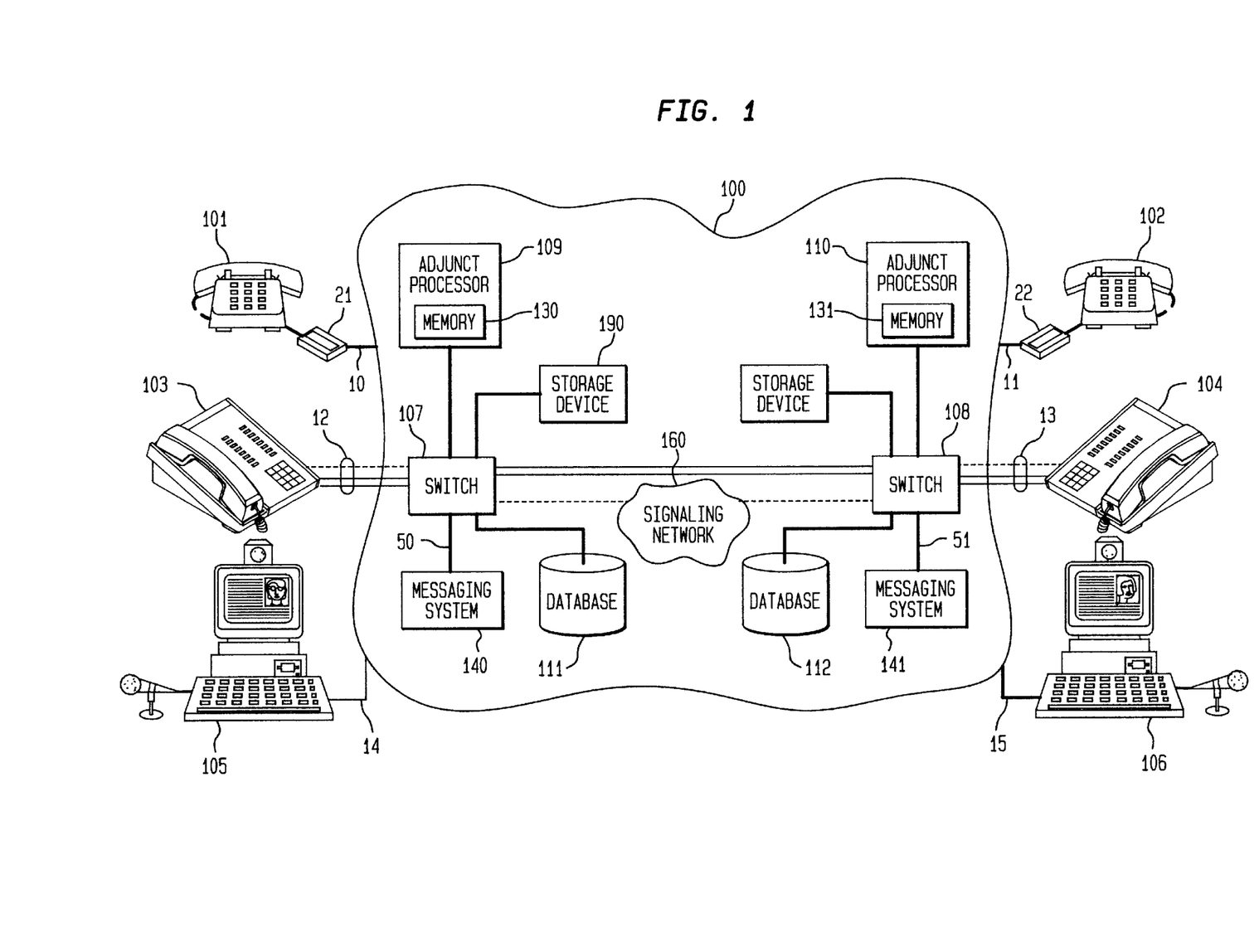
FIG. 1 is a functional block diagram illustrating a communications system which is arranged to provide called party identification service, in accordance with the present invention.

FIG. 1 shows in functional block diagram format a communications switching system 100 which includes similarly configured access/egress switches 107 and 108 that are connected respectively to functionally analogous adjunct processors 109 and 110 and equivalent databases 111 and 112. Because of the similarities of some of the components of FIG. 1, a description of the functionality of these components is provided below with reference to equivalent components indicated in parentheses for the sake of simplicity.

Switch 107 (108) is a processor-controlled, software-driven communications system that is arranged to route calls to destination numbers that are provided by a user or received from another switch. A well-known communications switch is the AT&T 5ESS® switch having features and functionality which are described in *AT&T Technical Journal,* Vol. 64, No. 6, part 2, pp. 1305–1564, July/August, 1985. Switch 107 (108) communicates with analog end-user devices, such as telephone set 101 (102), via physical interfaces which include analog ports and POTS facilities, such as line 10 (11). Other physical interfaces of switch 107 (108) include digital ports via which the switch transmits signals to digital facility 12 (13) for communications with ISDN telephone set 103 (104). Digital facility line 12 (13) is a Basic Rate Interference (BRI) loop which has two bearer channels. When switch 107 (108) serves a CATV cable distribution system, multimedia terminals such as set 105 (106) may be connected to the switch via coaxial cable 14 (15) that serves as a conduit for multiplexed data voice and video signals via one or more logical channels.

Switch 107 (108) is provisioned to support all the Business and Residence Custom Services (BRCS) features that may be offered on a subscription or call-by-call basis to end-user devices connected to the switch. A non-exclusive list of these features includes: speed dialing, automatic callback, voice mail, call forwarding, three-way calling, call waiting, and caller identification. The caller identification service, that is also referred to as "caller-id", allows an end-user device to receive the telephone number associated with an incoming call destined for that end-user device. When an incoming call is destined for analog telephone set 101 (102), switch 107 (108) delivers the originating telephone number associated with the call—also called "caller-id information"—between the first ring and the second ring. That information appears on a screen of display unit 21 (22), which is arranged to record and display caller-id numbers of incoming calls. Of particular significance among the features of display unit 21 (22) is its ADSI-compatibility characteristic which allows display unit 21 (22) to receive signaling information even when telephone set 101 (102) is off-hook. As is well known in the art, ADSI standards allow a central office switch, such as switch 107 (108) to send limited information, such as signaling information, to an analog telephone set regardless of whether the telephone set in on-hook or off-hook. Further information on the ADSI standards can be found in "Generic Requirements for an SPCS to Customer Premises Equipment Data Interface for Analog Display Services" BellCore Technical Reference (TR-NWT-001273), Issue 1, December 1992.

Switch 107 (108) is also arranged to forward caller-id and other signaling information to digital telephone set 103 (104) via the D channel (indicated by the broken line) of ISDN loop 12 (13). The forwarded signaling information received by ISDN telephone set 103 (104) is displayed on the screen of that set. Similarly, when switch 107 (108) serves a CATV cable distribution system, caller-id and other signaling information may be forwarded to multimedia terminal 105 (106) via a logical data channel of facility 14 (15).

Also connected to central office switch 107 (108) of FIG. 1 is adjunct processor 109 (110) which is a general purpose computer that executes instructions included in a software program stored in memory 130 (131). As per various embodiments of the invention, including embodiments related to on-demand communications services, the instructions of the software program are designed to create a record to be displayed to a subscriber based on input received from switch 107 (108).

For instance, in relation to the on-demand communications services of the Mirville application, when switch 107

Figure 2:
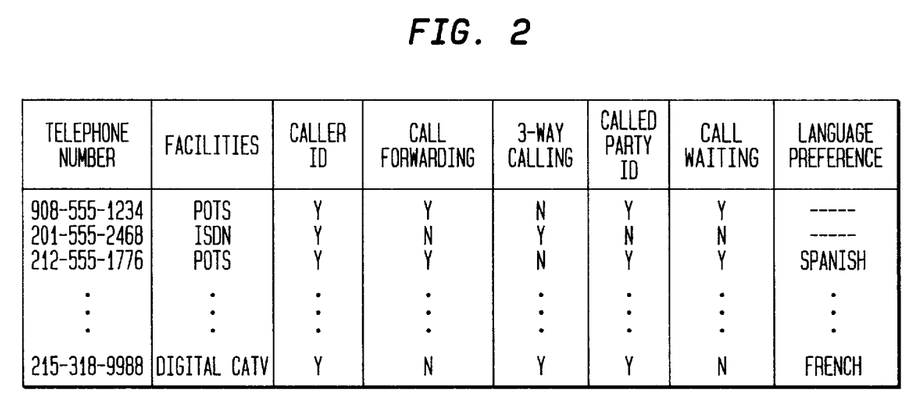
FIG. 2 depicts a table that maps pre-subscribed features to telephone numbers or addresses of communications services users.

(108) receives a request from calling party to complete a call to a called party, or when switch 107 (108) is to provide information or a record to a called end-user device, switch 107 (108) queries database 111 (112) to determine the types of features subscribed by one or both of the parties. Database 111 (112) is a repository of subscriber information which includes a table that correlates a subscriber's telephone number to features subscribed by the subscriber and the type of facility serving the subscriber. An illustrative representation of such a table is shown in FIG. 2 in which facilities serving subscribers are labeled POTS (for analog facilities), ISDN (for BRI facilities) and Digital CATV (for cable distribution system). A non-exhaustive list of features is also shown in FIG. 2 with "Y" and "N" entries indicating features pre-subscribed and non-subscribed, respectively, by a party. Included is the "called party ID" feature in accordance with the present invention. Optionally the table of FIG. 2 may include a language preference field which allows the subscriber to receive information in a preferred or selected language. Once switch 107 (108) retrieves a record for a subscriber, the retrieved record is forwarded to adjunct processor 109 (110) which uses that information to create the record (in a particular language) to be transmitted to the subscriber. Different types of records may be created by adjunct processor (109) 110 at different stages of a call, as explained below.

Figure 3:
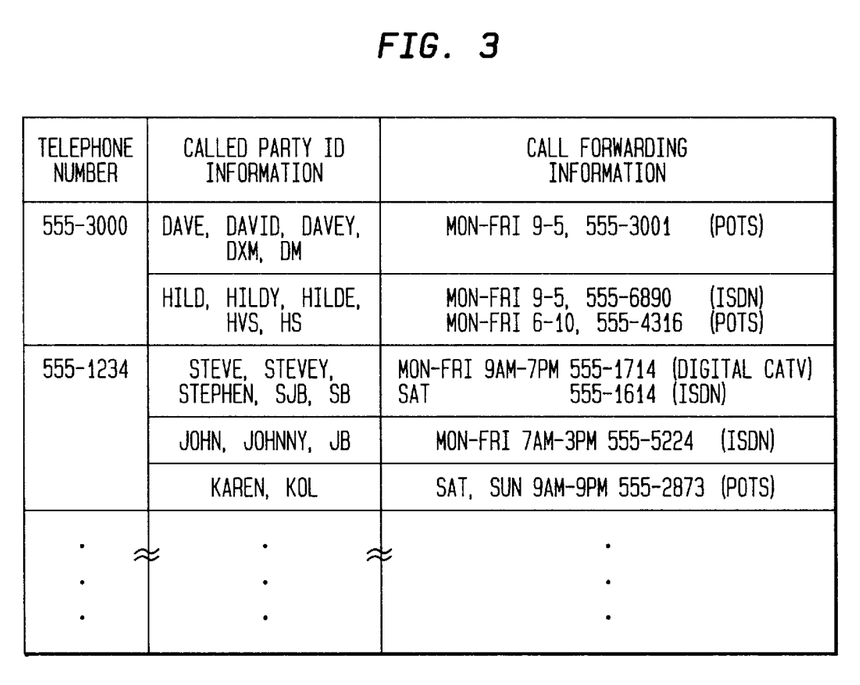
FIG. 3 depicts a routing table that maps called party IDs into is a flow diagram illustrating the processing of telephone calls in accordance with the invention.

In accordance with an embodiment of the present invention, database 111 (112) also stores user defined and alterable routing tables, such as the one shown in FIG. 3 for purposes of illustration. For each subscribing end-user device identified by a given telephone number, each of a plurality of individuals associated with the telephone number may enter various called party identification information ("called party id's"), as well as forwarding information. For instance, as shown, an individual identified by any of the called party id's "Dave", "David", "Davey", "DXM", or "DM" stores in the routing table call routing information that includes a list of forwarding numbers and corresponding times (i.e., call routing conditioned on time). Further, for the same end-user device identified by a common telephone number, an individual identified by any of the called party id's "Hild", "Hilde", "Hildy", "HVS", or "HS" stores time conditioned call routing information. Preferably, in accordance with an embodiment of the present invention, the call routing information also identifies the device type (e.g., analog telephone with ADSI, analog telephone without ADSI, ISDN telephone, etc.) of the end-user device associated with each forwarding telephone number. In addition, although not shown, each specified time interval may include more than one location/forwarding number or other parameters ordered in a individual specified sequence based, for example, on the likelihood that the individual will be at the respective locations at the given time.

In accordance with the on-demand communication services described in the Mirville application, in order to create a record, adjunct processor fetches from memory 130 (131) a messaging table from which adjunct processor 109 (110) extracts appropriate fields to be included in the record. The messaging table includes a list of features with associated activation codes (i.e., instructions on how to invoke the feature), and preferably any service fee for invoking each feature. For multimedia applications, the table also includes one or more pointers that direct adjunct processor 109 (110) to retrieve one or more graphic files for display to a multimedia terminal. The graphic file may include information associated with features such as picture substitution and picture muting. As is well known in the art of multimedia communications, picture substitution allows a party in a call to send a different picture than his own image during the call. The picture muting feature allows one of the parties in a call to prevent any image to be transmitted to another party.

The type of facility serving the subscriber is used by the adjunct processor to determine how to include information extracted from the table into a record to be displayed to a subscriber. For example, a record that is created for display to an analog end-user device, such as display unit 21 (22) may include abbreviated words because of the limited bandwidth available for ADSI data on POTS lines. By contrast, records created for display to ISDN-compatible end-user devices may be more detailed while multimedia terminals may receive records in pictorial animated format with detailed instructions on the functionality of these features and how to activate them.

Adjunct processor 109 (110) may include the fields in a record such that the fields are displayed in a particular order. For example, fields associated with pre-subscribed features may be displayed first. Fields associated with non-subscribed features may be displayed in decreasing order of general commercial acceptance. For pre-subscribed features, the service fee field is typically not included in the record.

Adjunct processor 109 (110) may also embody software and hardware for generating in-band voice prompts or information request to end-user devices, and for processing conventional dual tone multiple frequency (DTMF) and/or voice responses to the voice prompts. Such adjunct processor units may be provided by AT&T Voice Response Units (VRUs), such as a Conversant, and the Summa Four, which are external adjunct processors that may be coupled to the network via a Common Channel Interoffice Signaling (CCIS) link, or via an Integrated Services Digital Network (ISDN) communication link. Alternatively, the adjunct processor embodying such functions may be included within switches 107 (108).

Also shown in FIG. 1 is voice messaging system 140 (141) that is connected to switch 107 (108) via trunks 50 (51). Voice messaging system 140 (141) includes a call processing unit which executes a set of scripts to answer an incoming call and to greet a caller with a pre-recorded voice announcement that invites the caller to leave a message for a called party. A voice messaging system may be implemented using the AT&T Conversant® Voice System whose architecture and features are described in *AT&T Technical Journal* Vol. 65, Issue 5, pp. 34–47, Sep./Oct. 1986. When switch 107 (108) completes a call to a called party, switch 107 (108) listens to terminating supervisory signals or call progress tones (busy, ring-no-answer) in order to take specific actions based on the type of signal received. For example, when switch 107 (108) receives a signal from caller indicating that the caller would like to leave a message for a called party, switch 107 (108) transfers the call to voice messaging system 140 (141) which delivers an announcement to the caller inviting him or her to leave a message for the called party. The announcement would indicate to the caller, for example, that the carrier would attempt to contact the called party at periodic intervals to deliver the recorded message.

According to an aspect of the Mirville invention, voice messaging system 140 (141) is also arranged to deliver to callers pre-recorded announcements that explain the functionality provided by a particular feature. When a user dials a toll-free number associated with voice messaging system 140 (141), the caller is invited to enter the mnemonic associated with the feature of interest. For example, when a user enters *1 on a dial pad, the user will hear a pre-recorded announcement associated with the feature that is typically displayed with *1 as the activation code for invoking that feature. Alternatively a live operator may also explain the functionality provided by one or more features.

Communications switches 107 and 108 exchange call processing messages via a signaling network 160 which is comprised of a plurality of interconnected packet switching nodes that route the call processing messages to their appropriate destinations according to a defined protocol, such as the well-known Common Channel Signaling (CCS) protocol or CCIS protocol. Communications switch 107 (108) also includes a storage device 190 (191) which contains information associated with a particular line. For example, speed dial service subscribers may wish to keep on storage device 190 (191) abbreviated codes or spoken mnemonics associated with frequently called numbers such that when the speed dialing feature is invoked by a caller, switch 107 (108) can map an abbreviated code or a spoken word to a desired telephone number. In addition, in accordance with an embodiment of the present invention, speed dial service subscribers may also associate called party identification information with each abbreviated code or spoken mnemonic and the related telephone number. Further, storage device 190 (191) includes an automatic number identification ("ANI") "trigger table", which contains a list of the telephone numbers of subscribers to various special services offered by the telephone service provider. Also, in accordance with the Mirville invention, communications switch 107 (108) also includes a buffer (not shown) which stores pre-dialing records for display to on-demand communication service subscribers.

It is noted that although the communications system 100 of FIG. 1 does not show any toll switches of an Interexchange carrier, it is to be understood that one or more toll switches may be included in communications system 100.

Figure 4A:
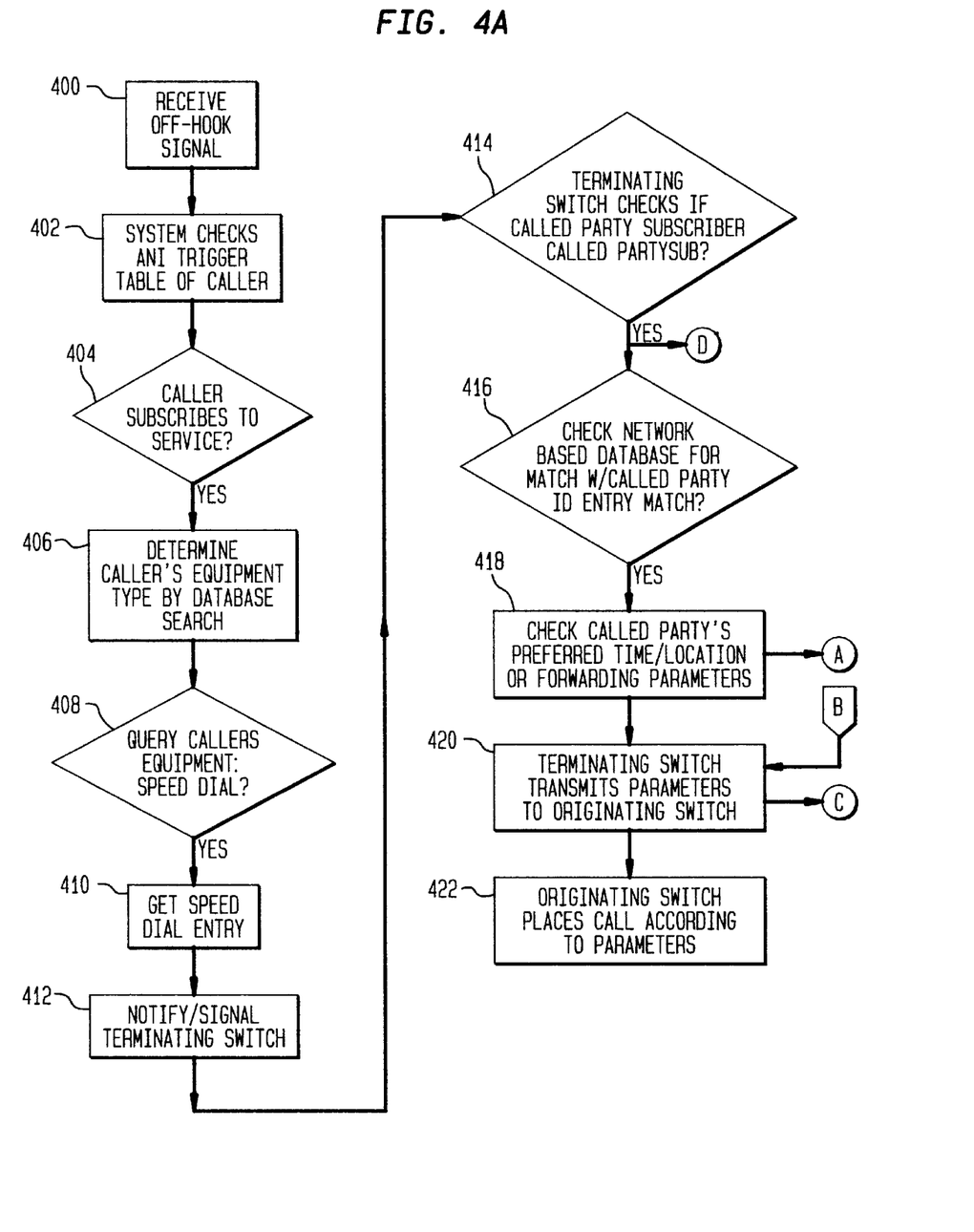
FIG. 4A is an illustrative operational flow diagram of functions executed by various components of the communications system of FIG. 1 to provide a called party identification service in accordance with the present invention.

Referring now to FIG. 4A, there is shown an operational flow diagram for the processing of a telephone call in accordance with an illustrative embodiment of the present invention. For purposes of clarity and simplicity of exposition, it is assumed that a call is initiated by telephone set 101 and directed to telephone set 102 according to a caller at telephone set 101 effectively selecting a telephone number which is associated with telephone set 102. It is understood that a telephone number, or generically a telephone identifier, is any number or data which points to a specific circuit (which may be, for example, a permanent, temporary, dynamic, virtual, analog or digital circuit) and may be associated with one or more distinct end-user devices. The caller at telephone set 101 decides to place a telephone call, thus resulting in reception of an off-hook signal at originating switch 107 (step 400). Using the caller's telephone number, the originating switch queries the ANI trigger table located in storage device 190 to check if the caller's telephone number appears (step 402).

If the caller's telephone number appears on the ANI trigger table, storage device 190 signals originating switch 107 that the caller via telephone set 101 subscribes to at least one of the special services offered by the telephone service provider (step 404). The originating switch 22 then queries data base 111 as to the particular special service offered by the telephone service provider to which the caller subscribes, as well as the caller's equipment type (e.g., as per table of FIG. 2). The database identifies the caller as a subscriber to network-based speed dialing, and queries the caller's telephone set for entry of a speed dialing activation key or mnemonic (step 408). If the caller invokes such an activation key or mnemonic, originating switch 107 locates the associated telephone number and called party ID information from storage device 190 (step 410).

If, however, (i) in step 408 the caller chooses not to invoke speed dialing, or (ii) in step 402 the caller's telephone number does not appear on the ANI trigger table such that the storage device 190 signals the originating switch 107 that the caller at telephone set 101 does not subscribe to any of the special services offered by the telephone service provider, then originating switch 107 then may connect the call via terminating switch 108 to telephone set 102 (not shown) provided the caller dials a telephone number associated with telephone set 102, or may execute alternative processes to attempt obtaining called party id information (not shown).

As an example of such an alternative process, originating switch 107 may ascertain, for example according to subscriber feature tables stored in database 112 accessed via terminating switch 108 or according to subscriber feature tables stored in a centralized database, whether the subscriber associated with telephone set 102 is a subscriber to the called party ID service. If called party ID is subscribed to by the subscriber associated with telephone set 102, then originating switch 107 may send voice prompts or queries to the caller (or send textual records for display), requesting whether the caller wishes to communicate, for example by DTMF signals, any called party identification information such as the name or initials of the called party. The caller then, may enter such called party ID information, which is received by originating switch 107. It may be understood that this process for obtaining called party ID information may be implemented directly in response to a caller placing a call, separately and independently of, or as an alternative to, the network-based speed dialing implementation illustrated in FIG. 4A.

Further, although the call initiation process which provides called party id data according to the embodiment of FIG. 4A is based on network-based speed dialing, it may be understood that various alternative implementations of call initiation may provide the called party identification data. For instance, an ISDN-compatible end-user device may store the called party identification data along with the respective telephone numbers of frequently called individuals, in accordance with a telephone-set speed dial or memory dial feature. Then, when a call is invoked via the speed dial feature of the telephone set, the stored called party ID data is sent to the originating switch via the D channel of the ISDN loop. It is also understood that analog telephone end-user devices may also include an associated digital storage means for storing called party ID data, which may be communicated in a data burst upon placing the call while the voice input from the handset is blocked off.

Another alternative is for speed dialing to be invoked in accordance with the invention described in the above-cited co-pending application, such that the speed dialing option is presented in a pre-dialing record to an on-demand communications service subscriber when the subscriber's end-user device goes off-hook. In such a scenario, if the subscriber invokes speed dialing the called party id information would also be obtained from storage device 190 within communications network 100. Alternatively, the pre-dialing record may include a "called party id" option, which allows the caller to enter the called party id information which is acquired by the originating switch.

In any case, by any of a variety of implementations, the originating switch obtains the called party identification information for the call. Then, referring again to FIG. 4A, the originating switch passes the called number and called party ID data via signaling network 160 to switch 108 (step 412), which is the terminating switch associated with called party end-user device, which for purposes of the description is defined as telephone set 102.

Using the telephone number, the terminating switch 108 queries the ANI trigger table in storage device 191 to check if the telephone number appears (step 414). If the telephone number does not appear on the ANI trigger table, storage device 191 signals the terminating switch 108 that the user of telephone set 102 does not subscribe to any of the special services offered by the telephone service provider, and the terminating switch 108 signals originating switch 107 that the call should be directly routed according to the telephone number, and originating switch 107 then routes the call via switch 108 to telephone set 102 (not shown).

If the telephone number appears in the ANI trigger table, the terminating switch 108 queries data base 112 to confirm that the particular called party ID service is subscribed to by the subscriber associated with the telephone number. If the called party ID service is not subscribed to, then the call is routed directly to telephone set 102 as described above for the event that the telephone number doesn't appear in the ANI trigger table.

If the telephone number appears in the ANI trigger table, and the subsequent data base 112 query indicates that the called party ID service is subscribed to, then data base 112 is queried to ascertain whether the called party ID information matches called party ID information listed in the routing table of FIG. 3 for the telephone number (step 416). If there is no match, then the terminating switch 108 signals originating switch 107 that the call should be directly routed according to the telephone number, and originating switch 107 then routes the call via switch 108 to telephone set 102 (not shown).

If there is a match in step 416, indicating that the called party (i.e., individual) has specified individual call routing parameters, these parameters are searched and processed by adjunct 110 to ascertain the currently operative call routing parameters (step 418). Terminating switch 108 transmits these currently operative call routing parameters to originating switch 107 via signaling network 160 (step 420), which in turn routes the call to an end-user device according to the currently operative call routing parameters to complete the call (step 422).

It is understood myriad variations within the purview of the present invention are available for implementing call completion or rerouting with called party ID information associated with the call. For instance, in accordance with the present invention, the process of completing the call in steps 418 and 420 of FIG. 4A, may be modified such that they include sending the called ID information, and any other information (e.g., caller ANI) to the called end-user device while holding the call at the originating switch, such that an individual located at the called end-user device may select from various call handling options based on this information, without first answering the call, thereby providing for manual call routing by an individual at the end-user device according to the called party identification (and any other) information. The means by which the called party ID information, and any other information, is provided depends on the end-user device type, which is preferably specified in the feature table (i.e., FIG. 2), as described hereinabove. In addition, this call treatment may be provided in accordance a ringing record presented (before the call is answered) to the end-user device, either automatically or as an option invoked by the individual located at the end-user device, in accordance with the on-demand communication services of the Mirville application.

Figure 4B:
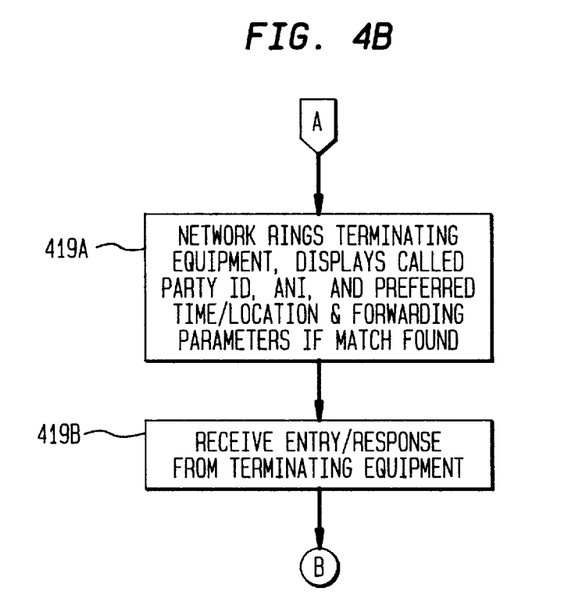
FIG. 4B is an illustrative operational flow diagram of functions executed in accordance with the operational flow of FIG. 4A to provide call routing based on an ISDN telephone set receiving called party ID, in accordance with an embodiment of the present invention.

FIG. 4B shows an example of such an alternative embodiment for an ISDN compatible telephone set, which for illustrative purposes is ISDN telephone set 104. While the call is held at originating switch 107 by adjunct 109, terminating switch 108 "rings" ISDN telephone set 104, and sends the called ID (and preferably caller ANI) information to ISDN telephone set 104 (step 419A) via the D channel (indicated by the broken line) of ISDN loop 13. Also, preferably the preferred time/location and forwarding parameters identified in step 418 are also presented for display on ISDN telephone set 104 as invokable call handling options. Preferably, the position in the sequence of possible forwarding parameters at the given time is also displayed, including whether the displayed forwarding parameter is the only, or last in the sequence of, specified forwarding parameter(s) for the given time. Then, via the telephone set keypad, the individual enters a call handling command which is sent to the terminating switch via the D channel (step 419B). The process of entering a command may involve interactive communication with adjunct 110 of terminating switch 108. Based on the call handling command, the terminating switch sends an appropriate parameter to originating switch 107, which routes the call accordingly (steps 420–422). Various options for call handling indicated by the command, and analogously by the parameter(s) signaled to originating switch 107, include: routing call to the end-device where the individual is located (e.g., for answer by the individual, answering machine, or voice mail; note that answer by the individual may be indicated by the ISDN telephone set going off-hook or by entry of a code) which is tantamount to normal call completion, and forwarding the call to another telephone number (e.g., to a end-user device where the called party is actually located, or to voice mail).

Figure 4C:
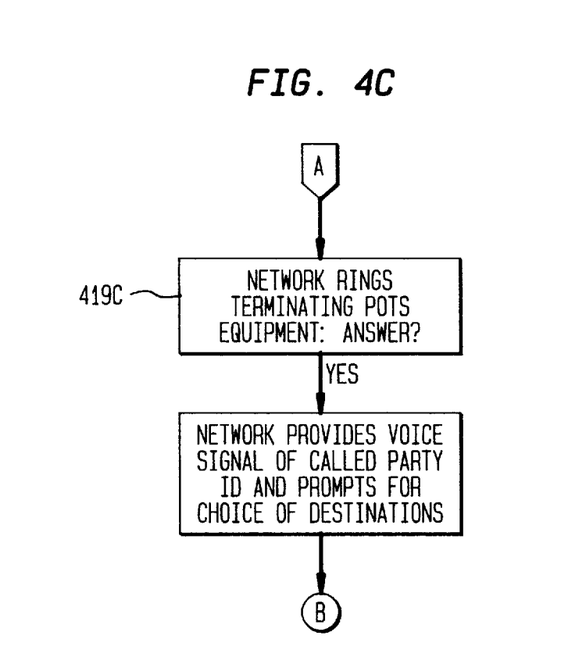
FIGS. 4C is an illustrative operational flow diagrams of functions executed in accordance with the operational flow of FIG. 4A to provide call routing based on a POTS telephone set receiving called party ID, in accordance with an embodiment of the present invention.

FIG. 4C shows an example of such an alternative embodiment for a POTs compatible, analog telephone set, which for purposes of illustration is analog telephone set 102. While the call is held at originating switch 107 by adjunct 109, terminating switch 108 rings telephone set 102, and sends the called ID (and preferably caller ANI) information to telephone set 102 (step 419) either via ADSI, or by voice prompt once the individual "answers" telephone set 102 (step 419C). Then, via a voice response to terminating switch 108 prompted queues, or via a voice-data modem or conventional modem, the individual provides a call handling command which is received by terminating switch 108 (step 419D). The process of entering a command may involve interactive communication with adjunct 110 of terminating switch 108. Also, preferably the preferred time/location and forwarding parameters identified in step 418 are also presented as voice prompt options. Based on the call handling command, the terminating switch sends an appropriate parameter to originating switch 107, which routes the call accordingly (steps 420–422).

As another variation, this caller ID information (and preferably the caller ANI) may be provided to the end-user device whenever the caller ID information is available, even where the end-user device telephone number does not trigger the caller ID service, or where the telephone number triggers the caller ID service but the caller ID information does not match information in the routing table. For calls routed to end-user devices not based on the routing table (or according to the routing table, but the routing table does not specify device type), called party ID information may be attempted using voice prompting if there is no information available as to device type. As a further variation, even in these situations, the individual located at the end-user device may be given the option of selecting from various call handling options, such as specifying a number for call forwarding. Such call treatment may be provided in accordance a ringing record presented (before the call is answered) to the end-user device, either automatically or as an option invoked by the individual located at the end-user device, in accordance with the on-demand communication services of the Mirville application.

It is further noted that as a further alternative implementation within the purview of the present invention, the called party ID information, and any other information (e.g., caller ANI) may be sent to the end-user device regardless of whether the end-user device has the option or ability to designate further routing of the call. The end-user device may be automatically selected by the described routing table look-up procedure, or may simply be the end-user device associated with the original call made by the caller without any routing tables stored in the communications network and concomitantly without any procedures for the communications network to reroute the call. In such an implementation, called party ID information nevertheless assists the individual at the end-user device in determining whether to personally answer the call, or to disregard the call, or to allow an automatic answering mechanism respond to the call.

Figure 4D:
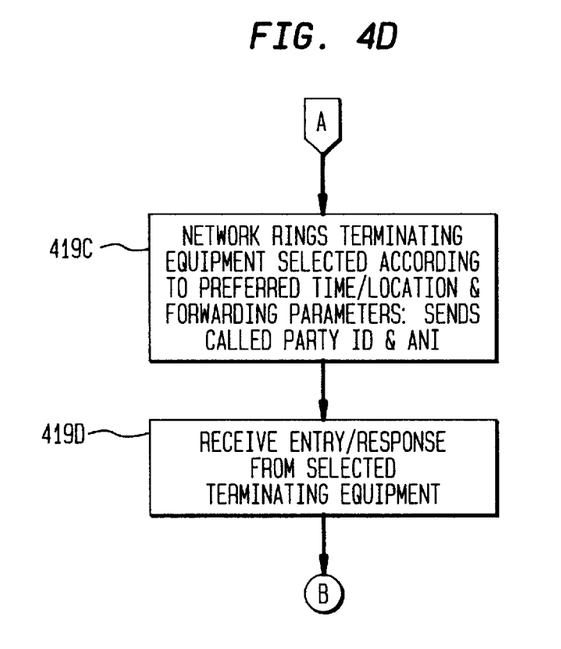
FIGS. 4D–4F are illustrative operational flow diagrams of functions executed in accordance with the operational flow of FIG. 4A to provide call routing with an end-user device receiving called party ID information, in accordance with various alternative embodiments of the present invention.
Figure 4E:
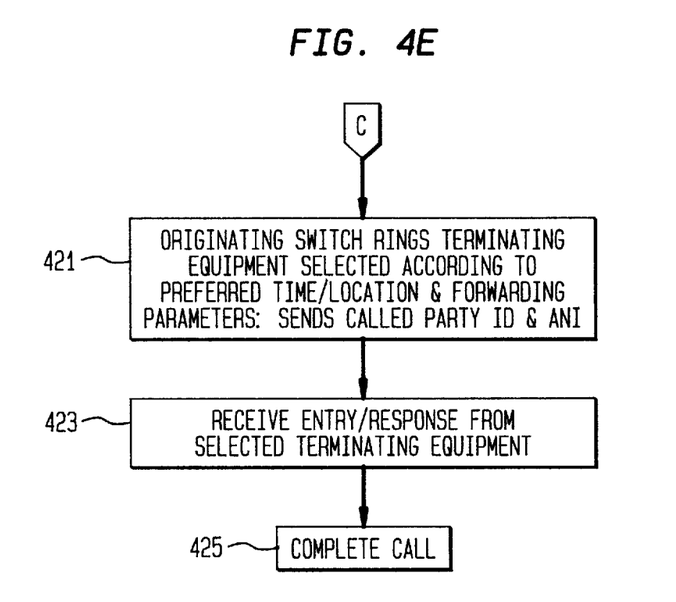
Figure 4F:
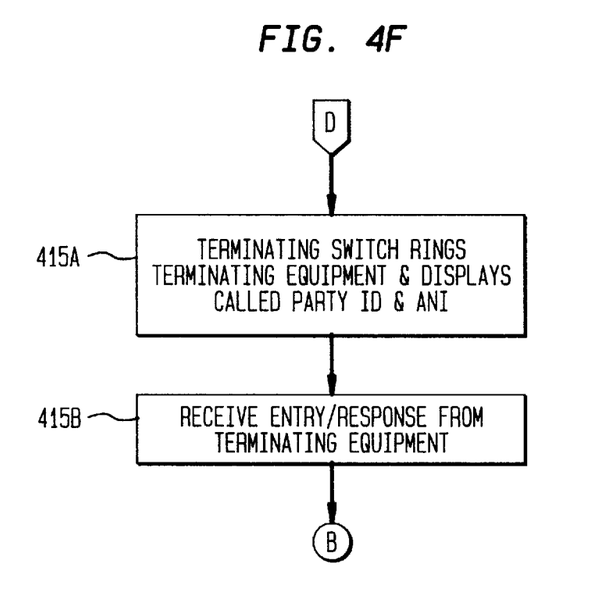

Some of these additional various implementations are shown in the embodiments illustrated by the operational flowcharts of FIG. 4D, FIG. 4E, and FIG. 4F. For instance, in FIG. 4D, after ascertaining the called party's preferred time/location and forwarding parameters, the terminating switch rings the terminating equipment that is designated according to the preferred time/location and forwarding parameters, while sending the called party ID information and preferably caller ANI (step 419C). Then, in step 419D, the terminating switch receives a call handling command (e.g., DTMF entry, off-hook signal, etc.) from the individual at the designated terminating equipment. Based on the call handling command, the terminating switch sends an appropriate parameter to originating switch 107, which routes the call accordingly (steps 420–422). It is noted that in this implementation, the parameters sent to originating switch 107 in step 420 reflect the call handling command: for instance, if the command indicated that the call should be forwarded to another end-user device, the parameters would include information (e.g., telephone number) for forwarding the call thereto. It is further understood that in a further implementation related to the embodiment of FIG. 4D, step 422 may be modified such that in the event that the individual at the designated equipment rang by the terminating equipment in step 419C provides a call forwarding command to another end-user device, then originating switch rings the appropriate end-user device while providing called party ID information (and preferably caller ANI) thereto such that the individual at the end-user device knows who is being called and may, as an additional option, further designated a call handling command.

Referring now to FIG. 4E and its relation to FIG. 4A, as an alternative to the embodiment illustrated by FIG. 4D, after ascertaining the called party's preferred time/location (step 418), the terminating switch may directly forward this information to the originating switch (step 420), and the originating switch may ring the appropriately designated terminating equipment while sending the called party ID and any related information such that the originating switch receives the entry/response from the designated terminating equipment (steps 421–423). Based on the call handling command, the originating switch 107 completes the call accordingly (step 425). It is further understood that in a further implementation related to the embodiment of FIG. 4E, in the event that the individual at the designated equipment rang by the originating equipment in step 421 provides a call forwarding command to another end-user device, then originating switch rings the appropriate end-user device while providing called party ID information (and preferably caller ANI) thereto such that the individual at the end-user device knows who is being called and may, as an additional option, further designated a call handling command. Accordingly, the call is not completed until an end-user device does not further designate forwarding of the call.

FIG. 4E, as it relates to FIG. 4A, illustrates an operational flow for an embodiment of the present invention which does not require storing preferred time/location or forwarding parameters in a network-based database. If the subscriber of an end-user device associated with the called party is a subsciber to the called party ID service (step 414), then the terminating switch holds the call while it rings the end-user device and sends the called party ID information (and preferably also caller ANI) such that this information is available to an individual at the end-user device without answering the call (step 415A). Then, in step 415B, the terminating switch receives a call handling command (e.g., DTMF entry, off-hook signal, etc.) from the individual at the end-user device. Based on the call handling command, the terminating switch sends an appropriate parameter to originating switch 107, which routes the call accordingly (steps 420–422). It may be understood that as a further embodiment in connection with the embodiment of FIG. 4F, if the individual at the end-user device selects call forwarding, then before the originating switch completes the call in step 422, it may ring the designated end-user device and provide the called party ID information thereto such that an individual at this designated end-user device may further specify a call handling option without answering the call. It is further understood that in yet an alternative implementation related to the embodiment of FIG. 4F, in the event that the individual at the end-user device rang by the terminating equipment in step 415A provides a call forwarding command to another end-user device, then the terminating switch initiates a network call for ringing the appropriate end-user device while providing called party ID information (and preferably caller ANI) thereto such that the individual at the end-user device knows who is being called and may, as an additional option, further designated a call handling command. Accordingly, in either of these alternative implementations to the embodiment of FIG. 4F, the call is not completed until an end-user device does not further designate forwarding of the call.

It may be appreciated, therefore, that the present invention provides many features, advantages, and attendant advantages for not only called party subscribers, but also for calling parties thereof. According to the invention, a single telephone number effectively becomes a mobility number for more than a single individual. That is, multiple individuals associated with a single telephone number can each provision network-based automatic call forwarding separately because a call placed by dialing the single telephone number provides called party identification information from the originating switch to the terminating switch. Thus, a single incoming call can be automatically forwarded by the network to any of multiple locations, conditioned on the called party identification. An attendant feature, therefore, is that any call handling mechanisms, such as screening and call forwarding, that previously could only be provided for a single user at the end-user device identified by the single telephone number or at an end-user device to which the call was forwarded, may be provided for multiple individuals associated with a single telephone number.

Further, according to another aspect of the invention, since an incoming call to an end-user device may include called party ID, an individual at the end-user device has additional information from which to decide upon a call handling action. The end-user device receiving the called party ID information may be the device associated with the telephone number dialed by the calling party, or may be also be an end-user device to which the call is forwarded from the end-user device associated with the dialed telephone number. In either case, the called party identification information received at the end-user device provides the individual at the end-user device with additional information from which to determine an appropriate or desired call handling action (e.g., call forwarding to the called individual, send to voice mail, answer directly, etc.). The called party ID information is useful to the individual in deciding call handling, regardless of whether caller ID or other information that identifies the calling party is also available.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages.

For instance, in a manner similar to caller ID, the called party ID may be stored in a premises based device (e.g., "caller/called party ID box", telephone set) preferably along with the caller ANI, even in the event that a call is not otherwise completed. Also, it is understood that whereas many of the above embodiments provide the end-user with call handling options, it is not necessary that a user have the option of providing call handling instructions to the network; the service may be provided such that called party ID information (and preferably caller ID information) is simply sent to the called end-user device along with a ringing signal so that a user at the end-user device knows who is being called (and preferably by whom) without answering the call.

In addition, it is understood that various implementations of the present invention may include a Private Branch Exchange (PBX) switching system, such as the AT&T Definite® System. For instance, for calls originating external to the PBX and routed through a public switched telephone network to the PBX for connection to an end-user device coupled to the PBX, the PBX may replace and otherwise perform many of the functions of the terminating switch, such as storing individual location/forwarding information in a database, and communicating this information to the network (e.g., ultimately to an originating switch). In addition, for intra-PBX (i.e., between premises-based end-user devices connected to the PBX) the PBX may subsume the complete functionality described hereinabove for the network.

It is further understood that alternative implementations are available for invoking or otherwise providing the called party ID service. For instance, once a caller dials a telephone number in order to reach an individual, the originating switch may check (either with the terminating switch or with a centralized database) that the telephone number is associated with a user who subscribes to the called party ID service. If the user is such a subscriber then the originating switch may prompt the calling party for entry (e.g., via DTMF) of called party information (e.g., name). Such an implementation is well suited as an on-demand service presented to the calling party in connection with the Mirville application incorporated herein by reference. As a related embodiment, if the called end-user device's subscriber subscribes to called party ID, a further database query can retrieve from the routing table all (or some) called party ID's for each individual associated with the called telephone number, and present these to the caller, so that the caller can specifically select one of them, thus preventing a mismatch which may result if a caller enters a name for a called party individual that is not found in that called party individual's routing table. In addition, in accordance with the Mirville application, as an alternative implementation for invoking called party ID, called party ID may be an option presented to the caller upon going off-hook. If the caller selects this option and provides a telephone identifier, then the network can check whether the telephone identifier is associated with a subscriber to the called party id service.

Further, although the hereinabove described embodiments of the invention include separate trigger tables, feature tables, and routing tables, the information embodied in these separate tables may be embodied by, for example, a single table, or any other logical and/or physical arrangement for storing this information. Further, although the hereinabove described embodiments distribute the routing tables, trigger tables, and other database information among switches, it is possible for this information to be stored in a centralized database accessible to all switches.

It is also understood that called party ID presents additional information which may be used as another parameter for prioritizing calls according to the method and system disclosed in related application Ser. No. 08/385,004 to Foladare, which is herein incorporated by reference. Accordingly, multiple individuals associated with a single telephone number may each individually prioritize calls, and specify call routing as well.

It is therefore intended that the present invention is not limited to the disclosed embodiments but should be defined in accordance with the claims which follow.

I claim:

1. A method implemented in a telephone network for routing a call that is initiated by a caller at a first end-user station, said call routing being performed based on a telephone identifier associated with a second end-user station, the method comprising the steps of:

receiving call setup information for said call, said call setup information including a called party identification information that (a) uniquely identifies an individual for whom said call is destined and (b) includes one or more forwarding parameters indicating one or more possible end-user stations that may be selected as a destination end-user station for forwarding the call to the individual;

sending to said second end-user station a first signal that includes (i) said called party identification information and (ii) position information indicating the relative position of said one or more forwarding parameters with respect to a predetermined sequence of said one or more forwarding parameters;

receiving a second signal from said second end-user station that generates said second signal in response to receiving said first signal wherein said second signal identifies a destination end-user station to route said call; and routing said call to said destination end-user.

2. A method in a telephone network for routing a call initiated by a caller at a first end-user station according to a telephone identifier associated with a second end-user station, comprising the telephone network executed steps of:

acquiring a called party identification information for said call prior to routing said call to an end-user station, said called party identification information uniquely identifying an individual for whom said call is intended;

selecting a third end-user station according to said called party identification information;

sending to said third end-user station a signal that includes said called party identification information;

receiving from said third end-user station, in response to said signal, a command signal that identifies a destination end-user station to forward said call; and routing said call to said destination end-user station.

3. The method according to claim 2, wherein said destination end-user station is said third end-user station.

4. The method according to claim 3, wherein said third end-user station is said second end-user station.

5. The method according to claim 2, wherein said third end-user station is said second end-user station.

6. The method according to claim 2, wherein said third end-user station is said destination end-user station.

7. The method according to claim 2, wherein said selecting step includes the network executed steps of:

searching data stored in the network to determine whether said called party identification information appears in said data;

identifying said third end-user station according to said data in the event that said called party identification information appears in said data; and identifying said third end-user station as said second end-user station in the event that said called party identification information does not appear in said data.

8. The method according to claim 7, wherein said searching step includes the steps of:

searching a trigger table to determine whether said telephone identifier of said second end-user station appears in the trigger table; and searching, in the event that said telephone identifier appears in said trigger table, a routing table associated with said telephone identifier to determine whether said called party identification information appears in said routing table which includes at least one called party identifier for each of at least one individual associated with said second end-user station, said called party identifier uniquely identifying the associated individual from any other individual associated with said telephone identifier and being compared with said called party identification information, said routing table further including for each of said at least one individual routing information from which said third end-user station may be identified.

9. The method according to claim 2, wherein said signal that includes said called party identification information includes one or more forwarding parameters indicating one or more possible end-user stations that may be selected as the destination end-user station for forwarding the call to the individual.

10. The method according to claim 9, wherein said signal includes position information indicating the relative position of said one or more forwarding parameters with respect to a predetermined sequence of said one or more forwarding parameters.

11. A method in a telephone network for routing a call initiated by a caller at a first end-user station according to a telephone identifier associated with a second end-user station, comprising the telephone network executed steps of:

acquiring a called party identification information for said call prior to routing said call to an end-user station, said called party identification information uniquely identifying an individual for whom said call is intended; and routing the call to a destination end-user station;

wherein said step of obtaining said called party identification information includes the steps of:

sending to said first end-user station a query signal requesting entry of called party identification information;

receiving a signal containing said called party identification information from said first end-user station in response to said query signal.

12. The method according to claim 11, wherein said query signal is sent to said first end-user station in response to receiving from said end-user station a selection signal indicating that called party identification information is desired to be entered at said first end-user station.

13. A method in a telephone network for routing a call initiated by a caller at a first end-user station according to a telephone identifier associated with a second end-user station, comprising the telephone network executed steps of:

acquiring a called party identification information for said call prior to routing said call to an end-user station, said called party identification information uniquely identifying an individual for whom said call is intended; and routing the call to a destination end-user station;

wherein said step of acquiring said called party identification information includes the steps of:

determining, in response to said call being initiated, whether said telephone identifier is associated with a called party identification feature;

sending to said first end-user station, in the event that said telephone identifier is associated with the called party identification feature, a query signal requesting designation of called party identification information; and receiving a signal indicative of said called party identification information from said first end-user station in response to said query signal.

14. The method according to claim 13, wherein said sending step includes the step of sending to said first end-user station one or more called party identifiers associated with the telephone identifier and retrieved by the network from a network-based database of called party identification information, wherein the caller at said first end-user station may select one of said one or more called party identifiers to generate said signal indicative of said called party identification.

* * * * *